Patented Mar. 22, 1949

2,465,299

UNITED STATES PATENT OFFICE 2,465,299

LAMINATED PRODUCT EMBODYING A LOW ODOR PHENOL-FORMALDEHYDE RESIN

Joseph J. Wachter, Wilkinsburg, Pa., assignor to Westinghouse Electric Corporation, East Pittsburgh, Pa., a corporation of Pennsylvania No Drawing. Application January 1, 1945, Serial No. 571,024

5 Claims. (Cl. 154—43)

This invention relates to the preparation of a phenol-formaldehyde resin, which, when thermoset, is characterized by an exceedingly low odor level. In particular, this invention relates to the preparation of laminated and molded products embodying such low odor phenol-formaldehyde resin for household appliances and similar types of equipment.

It is well known that some phenol-aldehyde resins have an extremely strong odor and their use for devices and apparatus associated with food or household appliances is accordingly undesirable. Suggestions have been made in the prior art with respect to various compositions or surface coatings and other artifices to reduce or minimize the odor present in or evolvable from phenol-aldehyde resinous products. While various masking means such as surface layers of a low odor resin or paint or the like have been proposed, the diminution of the observable phenolic odor has not been satisfactory in all cases. Furthermore, the cost of applying specially adapted surface coatings to phenolic members to prevent the odor from escaping has greatly reduced the economical advantages of the phenolic resinous products.

While many attempts have been made heretofore to produce a phenol-aldehyde resin having an inherently low odor level in and of itself, these attempts have not been particularly successful. For example, in preparing phenol-aldehyde laminates for use in refrigerator panels, even the lowest odor phenol-aldehyde resins made hitherto required a surface sheet of some resin such for example as melamine aldehyde or vinyl acetate in order to reduce the odor which would have otherwise developed in use.

The object of this invention is to provide for a phenol-formaldehyde resin composition characterized by an exceptionally low odor.

A further object of the invention is to provide for the preparation of molded products from a phenol-formaldehyde resin of such exceptionally low odor level that the products may be employed for practically all types of use without the necessity of applying thereto masking or odor diminishing surface coatings.

Other objects of the invention will in part be obvious and will in part appear hereinafter. For a better understanding of the nature and objects of the invention, reference should be had to the following detailed description.

In producing phenol-formaldehyde resins of low odor level, it has been found that the determination of the odor level is subject to a number of variables. A given phenol-formaldehyde resin that is regarded as having a low odor level by one person may be judged by some other individual as having a strong odor. Apparently certain individuals have a much keener perception of some ingredient or material present in the resin than do other individuals. Furthermore, a phenol-aldehyde resin that ordinarily may be regarded as having substantially no odor when exposed to the open atmosphere, the same resin, when confined within a space, may evolve a concentration of odoriferous or pungent vapors. Under these latter conditions the resin may be considered highly objectionable.

In particular, refrigerator applications for resins call for a very high standard relative to freedom from objectionable odor. Phenol-aldehyde resin moldings positioned within refrigerator compartments are subjected to a high degree of humidity which has been found to particularly bring out objectionable odors from phenolic resins. When these conditions of relatively high humidity are accompanied with the closed compartment conditions and the tendency for the odoriferous volatile material to concentrate adjacent the cooler portions of the refrigerator coils, food products may accumulate a very objectionable odor, as well as an objectionable taste. The relative difference in temperatures between the resin moldings which generally are placed in the warmer portions of the refrigerator and the cooling coils, in effect, produces a distillation of the volatile odoriferous material from the phenolic material.

An inherent difficulty with defining the relative odor level of any type of phenol-aldehyde resin or molded member produced therefrom appears in the relative degree of sensitivity of different individuals to the volatile odoriferous constituents. In evaluating odorless phenol-aldehyde-type resins, it has been found necessary to average the comparative judgment of a relatively large number of people regarding their reaction to the odor of any given sample of material. The materials of this invention have been tested by submission of carefully prepared test samples to a large number of people. From ten to ninety persons have been employed in making the test.

In the literature and patent art, there have been described a number of tests for determining the odor characteristics of phenol-aldehyde resins and the ability of the odor to be imparted to and be retained by certain foods. In some tests, taste has been employed as a criterion for odor level. A well known test, for example, is to moisten with water a sample strip of the phenol-aldehyde member being tested, and the sample, together with a small sample of fresh, sweet unsalted butter, is placed in a test tube and the whole refrigerated for twenty-four hours at temperatures of about 40° F. to 45° F. The sample of butter is then both tasted and smelled to determine its relative freedom from objectionable taste and odors. It has been discovered that this test is of limited applicability. Actually the smelling portion of the test is not particularly significant except for resins of strong odor. The taste portion of the test apparently is determinative essentially of excess free phenol in the phenol-aldehyde resin. If the sample of butter does contain significant amount of free phenol, the phenol so affects the tongue of the taster that his relative judgment of taste is impaired for several hours. In fact for some time thereafter, when the tester tries subsequent phenol-free samples of butter, they will all taste phenolic. Furthermore, the taste test is not satisfactory since the relative discrimination between different degrees of contamination is relatively poor. No adequate comparison can be run between successive samples.

In producing the invention disclosed herein, a more satisfactory method for testing and rating phenol-aldehyde materials in regard to their relative odor levels has been developed. In this test, a small amount of cured thermoset phenol-aldehyde material, 10 to 15 grams in weight, is shaved into fine flakes and placed within a 100 cc. glass bottle provided with a glass stopper. The shavings are wetted with approximately 10 cc. of hot water and the glass stopper is inserted into the bottle. The bottle is kept at 60° C. for twenty-four hours. Several samples are submitted to each of a series of individuals for a comparative rating on relative odor level. Each tester first shakes the bottle and upon opening the stopper sniffs at the mouth of the bottle. For practical purposes, the tester records the relative odor level, stating whether he detected a strong odor characteristic of phenol-aldehydes, or a moderate amount, or substantially no odor at all and rates the odor level of the sample by the number 3, 2 or 1, respectively. The bottle is immediately stoppered and after a period of at least twenty minutes a second individual repeats the test. From about ten to ninety individuals have been employed in determining the odor rating of any particular type of material. Adding up the total odor level numbers for a given resin and dividing the total by the number of testers gives an average odor value.

In testing a greater number of materials by the above test, remarkably consistent duplication in rating has been secured between tests of the same samples run at different times.

It has been discovered that the reaction product of phenol (hydroxy benzene), preferably synthetic phenol, combined with formaldehyde in particular proportions under certain predetermined conditions using an amine type catalyst, results in a resin which, when thermoset to the infusible state, produces a substantially odorless molded product. The resin has such an exceptionally low odor level that no phenol-aldehyde resin of a great number with which comparisons have been made by means of the highly sensitive odor test described herein, even approaches the present resin in lack of perceptible odor. Applicant is not able to suggest any theory which would explain why the resin of the present invention possesses such low odor level. Possibly the preparation of the resin produces only relatively large molecules having a very low vapor pressure and having substantially no short molecules capable of volatilizing readily.

Hereafter "phenol" shall refer to hydroxy benzene alone.

The low odor resin of this invention is prepared by reacting one mol of phenol with from 1.15 to 1.35 mols of formaldehyde. Aqueous solutions of formaldehyde or paraformaldehyde, or substances engendering formaldehyde, or mixtures of any of these substances, may be employed. This ratio of phenol to formaldehyde is critical and any appreciable departure from the range will increase the objectionable odor level of the resulting resin rapidly as the amount of departure is increased. Likewise, the substitution of other phenolic homologues for hydroxy benzene increases the amount of objectionable odor present in the final product.

In reacting the phenol and formaldehyde, it has been found that a relatively low proportion of amine catalyst gives the preferred results. In particular, ethylene diamine in an amount of from 0.45% to 0.55% of the weight of the phenol gives the best results as the catalyst. Other amine catalysts with the respective proportions producing an equivalent effect are given in the following table:

TABLE I

| Catalyst | Amount based on phenol used |
| --- | --- |
| | Percent |
| Ethylene Diamine | 0.45 to 0.55 |
| Hexamethylene Tetramine | 1.15 to 1.35 |
| Dimethyl Amine | 0.7 to 0.8 |
| Methyl Amine | 0.9 to 1.1 |
| Ethyl Amine | 1.4 to 1.6 |

It will be apparent from these examples that the proportion of the amine catalysts may be varied within a narrow range. The amount of catalyst obviously depends on the activity of the catalyst.

As an example of suitable proportions, the following is typical:

*Example*

| | |
| --- | --- |
| Phenol (synthetic) | 1.0 mol |
| Formaldehyde (38% aqueous solution) | 1.25 mols |
| Ethylene diamine 70% aqueous solution) | 0.5% of weight of phenol |

The phenol, formaldehyde and the amine catalyst are placed in a reaction vessel equipped with a heater and a reflux column. The reactants are heated to 100° C. and allowed to reflux for a period of time of from 90 minutes to 135 minutes (1.5 to 2.3 hours), with a reflux time of 120 minutes appearing to give the optimum results. At the end of the refluxing period, the reaction vessel is connected to a vacuum pump and the absolute pressure is reduced to about 0.1 atmosphere absolute pressure or less. The temperature of the resin drops below 100° C. during the initial stage of distillation and rises slowly as evacuation proceeds. It should not appreciably exceed 150° C. As 150° C. is exceeded the resin rapidly becomes solvent-insoluble and then thermosets. As low polymers of phenol-formaldehyde are distilled off, the vacuum must be increased to an absolute pressure of as low as 0.01 atmosphere. In one particular case involving the reactants of Table I, distillation was initiated at an absolute pressure of 40 millimeters of mercury and continued until an absolute pressure of 20 millimeters of mercury at a temperature of 150° C. was attained. During evacuation any unreacted phenol, formaldehyde, water and other volatile ingredients, as well as low polymers, are removed.

After distillation, solvent is added to kill the reaction and to dissolve the reaction product. Toluene, benzol, alcohol, or mixtures of these or other solvents may be employed in producing a phenol-formaldehyde varnish for impregnating purposes. Solutions of any desirable solids content may be produced. A 40% to 60% by weight solids content varnish has suitable viscosity for most impregnating applications.

Fibrous materials of all kinds may be treated with the phenol-formaldehyde varnish to be prepared. Kraft paper, alpha cellulose paper, cotton, duck, glass cloth, asbestos cloth, asbestos paper, and various other materials both in sheet or other form may be treated with the phenol-formaldehyde varnish. Treated sheet material may be dried in ovens or towers heated by gas, infrared lamps, or resistance heaters or the like to evaporate the solvent and to convert the phenol-formaldehyde resin to a more advanced polymer commonly known as the "B" stage.

The treated sheet material with the phenol-formaldehyde resin present thereon may be cut or punched into predetermined shape, and a plurality of the shaped sheets stacked into a body which is subjected to a pressure of from 500 pounds to 5000 pounds per square inch and heated to temperatures of from 135° C. to 180° C. for a period of time sufficiently to convert to the infusible or "C" stage. In some cases the heat treatment may be effectuated by applying a high frequency electrical field to the resin impregnated sheets when under pressure in order to convert the resin to the infusible state. The resin impregnated sheet material may be chopped or lacerated and then molded under heat and pressure into any required molded product.

In determining the relative odor level of alpha cellulose impregnated with the resin of this invention and molded into a panel ¼ inch thick, a test was conducted employing 82 individuals. The rating of one (1) would be given the sample if the individual was unable to detect any appreciable odor using the test involving fine shavings of the laminate placed in a bottle and wetted with water as described herein, the rating would be two (2) if a moderate odor was detected and three (3) if a strong odor were noted. For the purposes of comparison, the following phenol-aldehyde laminates were compared at the same time with that of the present invention as follows:

TABLE II

Rating of phenol-aldehyde laminates

| Total Points | Average (Total Points Divided by 82) |
|---|---|
| *Present resin* | |
| Present Resin—84 | 1.02 |
| A—195 | 2.38 |
| C—128 | 1.56 |
| D—126 | 1.54 |
| E—130 | 1.59 |

A is the lowest odor phenol-aldehyde resin previously known.
C is the present resin with M.-P. cresol substituted for phenol.
D is the present type formulation except that the ratio of phenol to formaldehyde is 1:1.05.
E is the formulation of Table II but with 1% ethylene diamine.

Clearly the composite judgment of the testers is that no odor is evolved by the resin of this invention. It will also be apparent from the above table that the composition and the method of reacting is critical.

The mechanical properties of laminates prepared with the phenol-formaldehyde resin described herein are excellent. Using alpha cellulose paper and impregnating with the phenol-formaldehyde resin of this invention typical laminates had a tensile strength of 16,000 pounds per square inch, a flexural strength of 26,000 lbs. per square inch, a Charpy impact strength of 2.9 foot pounds per square inch, and a moisture absorption of 1.7% in twenty-four hours. Other physical properties were equally high and indicated that the resin is fully adequate to meet all expected engineering requirements.

A particularly desirable application for the resin of this invention is in the preparation of refrigerator door panels. The door panels are placed at the inside of the refrigerator doors where they serve structural functions, and retain heat insulation in place as well as having some heat insulating value. Due to the low odor level of the phenol aldehyde resin produced according to the invention, no special effort need be made to apply any surface coating in an attempt to seal in undesirable phenolic odors. Since phenol-formaldehyde resins ordinarily are available only as relatively dark materials, the refrigerator door panels may be painted or otherwise coated with some enamel or other material in order to produce a decorative or light colored surface coating. However, no special effort is required to develop an odor penetration resistant surface coating.

Obviously the use of the present resin in making refrigerator door panels is only one desirable use. Wherever food is handled or personal contact is made, the resin described herein may be employed to advantage.

Since certain changes may be made in the above invention and different embodiments of the invention may be made without departing from the scope thereof, it is intended that all matter contained in the above-described disclosure shall be interpreted as illustrative and not in a limiting sense.

I claim as my invention:

1. A phenol-formaldehyde resin characterized by exceptionally low odor when fully cured comprising the reaction product of only 1.0 mol of phenol and from 1.15 to 1.35 mols of formaldehyde heated to 100° C. in water as the reaction medium and refluxed for from 1.5 to 2.3 hours in the presence of an alkyl amine catalyst from the group consisting of from 0.45% to 0.55% of ethylene diamine, 1.15% to 1.35% of hexamethylene tetramine, 0.7% to 0.8% of dimethyl amine, 0.9% to 1.1% of methyl amine and 1.4% to 1.6% of ethyl amine, the amount based on the weight of the phenol, the refluxed product being subjected to distillation at an absolute pressure of from 0.1 to 0.01 atmosphere while at a temperature of above 100° C. but not materially exceeding 150° C.

2. An article of manufacture comprising a fully cured thermoset phenol-aldehyde resin comprising the reaction product of only 1.0 mol of phenol and from 1.15 to 1.35 mols of formaldehyde heated to 100° C. in water as the reaction medium and refluxed for from 1.5 to 2.3 hours in the presence of an alkyl amine catalyst from the group consisting of 0.45% to 0.55% of ethylene diamine, 1.15% to 1.35% of hexamethylene tetramine, 0.7% to 0.8% of dimethyl amine, 0.9 to 1.1% of methyl amine and 1.4% to 1.6% of ethyl amine, the amount based on the weight of the phenol, the refluxed product being subjected to distillation at an absolute pressure of from 0.1 to 0.01 atmosphere while at a temperature of above 100° C. but not materially exceeding 150° C.

3. A laminated member comprising a fibrous material and a phenol-formaldehyde resin applied thereto, the fibrous material being bonded by the resin in the substantially cured state, the phenol-formaldehyde resin comprising the reaction product of only 1.0 mol of phenol and from 1.15 to 1.35 mols of formaldehyde heated to 100° C. in water as the reaction medium and refluxed for from 1.5 to 2.3 hours in the presence of an alkyl amine catalyst from the group consisting of 0.45% to 0.55% of ethylene diamine, 1.15% to 1.35% of hexamethylene tetramine, 0.7% to 0.8% of dimethyl amine, 0.9 to 1.1% of methyl amine and 1.4% to 1.6% of ethyl amine, the amount based on the weight of the phenol, the refluxed product being subjected to distillation at an absolute pressure of from 0.1 to 0.01 atmosphere while at a temperature of above 100° C. but not materially exceeding 150° C.

4. A phenol-formaldehyde resin characterized by exceptionally low odor when fully cured comprising the reaction product of only 1.0 mol of phenol, and 1.25 mols of formaldehyde heated to about 100° C. in water as the reaction medium and refluxed for 2 hours in the presence of a catalyst composed of ethylene diamine in an amount equal to from 0.45% to 0.55% of the weight of the phenol, the refluxed product being subjected to distillation at an absolute pressure of from 0.05 to 0.02 atmospheres while at a temperature of over 100° C. but not materially exceeding 150° C.

5. A refrigerator panel composed of a plurality of sheets of fibrous material, a thermoset phenol-formaldehyde resinous binder applied to the sheets to bond the whole into the panel, the resin comprising the reaction product of only 1.0 mol of phenol, and 1.25 mols of formaldehyde heated to about 100° C. in water as the reaction medium and refluxed for 2 hours in the presence of a catalyst composed of ethylene diamine in an amount equal to from a 45% to 0.55% of the weight of the phenol, the refluxed product being subjected to distillation at an absolute pressure of from 0.05 to 0.02 atmospheres while at a temperature of over 100° C. but not materially exceeding 150° C. and a surface coating applied to the panel.

JOSEPH J. WACHTER.

REFERENCES CITED

The following references are of record in the file of this patent:

UNITED STATES PATENTS

| Number | Name | Date |
|---|---|---|
| 1,873,575 | Greenwald | Aug. 23, 1932 |
| 1,955,731 | Bender | Apr. 24, 1934 |
| 2,151,975 | Kline | Mar. 28, 1939 |
| 2,359,097 | Elsey | Sept. 26, 1944 |

FOREIGN PATENTS

| Number | Country | Date |
|---|---|---|
| 363,694 | Great Britain | Dec. 18, 1931 |
| 425,389 | Great Britain | Mar. 13, 1935 |

OTHER REFERENCES

Morgan et al.: Jour. Soc. Chem. Ind. (Trans.) Sept. 8, 1933.